(12) United States Patent
Bhattacharyya et al.

(10) Patent No.: US 11,594,747 B2
(45) Date of Patent: Feb. 28, 2023

(54) TETRAVALENT BORON-CONTAINING PROTON-EXCHANGE SOLID SUPPORTS AND METHODS OF MAKING AND USING TETRAVALENT BORON-CONTAINING PROTON-EXCHANGE SOLID SUPPORTS

(71) Applicant: 1s1 Energy, Inc., Portola Valley, CA (US)

(72) Inventors: Sukanta Bhattacharyya, Belmont, CA (US); Daniel Sobek, Portola Valley, CA (US)

(73) Assignee: 1s1 Energy, Inc., Portola Valley, CA (US)

( * ) Notice: Subject to any disclaimer, the term of this patent is extended or adjusted under 35 U.S.C. 154(b) by 0 days.

(21) Appl. No.: 17/521,735

(22) Filed: Nov. 8, 2021

(65) Prior Publication Data

US 2022/0140373 A1    May 5, 2022

Related U.S. Application Data

(63) Continuation of application No. PCT/US2021/038956, filed on Jun. 24, 2021, which is a continuation-in-part of application No. PCT/US2021/029705, filed on Apr. 28, 2021.

(60) Provisional application No. 63/109,943, filed on Nov. 5, 2020.

(51) Int. Cl.
*H01M 8/10*      (2016.01)
*H01M 8/1041*    (2016.01)
*H01M 8/1004*    (2016.01)

(52) U.S. Cl.
CPC ....... *H01M 8/1055* (2013.01); *H01M 8/1004* (2013.01); *H01M 2008/1095* (2013.01); *H01M 2300/0071* (2013.01); *H01M 2300/0082* (2013.01); *H01M 2300/0094* (2013.01)

(58) Field of Classification Search
CPC ....... H01M 8/1004; H01M 2008/1095; H01M 2300/0071; H01M 2300/0082; H01M 2300/0094
See application file for complete search history.

(56) References Cited

U.S. PATENT DOCUMENTS

| | | | |
|---|---|---|---|
| 2006/0008692 | A1 | 1/2006 | Sawa |
| 2006/0027789 | A1 | 2/2006 | Ivanov |
| 2011/0223518 | A1* | 9/2011 | Hirakimoto ............ C08J 5/2275 |
| | | | 429/492 |
| 2012/0045704 | A1 | 2/2012 | Choudhury |

(Continued)

FOREIGN PATENT DOCUMENTS

| | | |
|---|---|---|
| CN | 102924720 | 2/2013 |
| KR | 20180089525 | 8/2018 |

OTHER PUBLICATIONS

"International Search Report and Written Opinion received in International Application No. PCT/US2021/038956 dated Oct. 20, 2021."

(Continued)

*Primary Examiner* — Helen Oi K Conley
(74) *Attorney, Agent, or Firm* — ALG Intellectual Property, LLC

(57) ABSTRACT

A boron-containing proton-exchange solid support may include a proton-exchange solid support comprising an oxygen atom and a tetravalent boron-based acid group comprising a boron atom covalently bonded to the oxygen atom.

26 Claims, 11 Drawing Sheets

(56) References Cited

U.S. PATENT DOCUMENTS

| | | |
|---|---|---|
| 2018/0375157 A1 | 12/2018 | Garsuch |
| 2020/0295394 A1 | 9/2020 | Al-Sheikhly |
| 2021/0159530 A1 | 5/2021 | Epshteyn |

OTHER PUBLICATIONS

Ford, et al.,"Molecular Complexes of Boron Trifluoride With Some Formyl Compounds, HCOX (X=H, CH3, NH2, OH, F): Effect of Substitution, and Extension to X=Li, BeH, and BH2", South African Journal of Chemistry. 2018; abstract; p. 141, col. 1, second paragraph.

Mamlouk, et al.,"A boron phosphate-phosphoric acid composite membrane for medium temperature proton exchange membrane fuel cells, Journal of Power Sources." Jul. 2015; title; abstract; p. 291, col. 2, first-third paragraphs.

Wen, et al., "Sulfonated poly(ether sulfone) (SPES)/boron phosphate (BPO4) composite membranes for high-temperature proton-exchange membrane fuel cells", International Journal of Hydrogen Energy. 2009; abstract; p. 8984, col. 2, first paragraph; p. 8989 col. 1, first paragraph.

Du, et al., "Ionic Covalent Organic Frameworks with Spiroborate Linkage", Angewandte Chemie, vol. 55, Dec. 23, 2015, p. 1737-1741.

Higuchi, et al., "Gas diffusion electrodes for polymer electrolyte fuel cells using borosiloxane electrolytes", Solid State Ionics, vol. 171, Jun. 30, 2004, p. 45-49.

Kalaj, et al., "MOF-Polymer Hybrid Materials: From Simple Composites to Tailored Architectures", Chem Rev. Aug. 26, 2020; 120 (16):8267-8302. doi: 10.1021/acs.chemrev.9b00575. Epub Jan. 2, 2020. PMID: 31895556.

Suzuki, et al., "Proton Conducting Borosiloxane Solid Electrolytes and Their Composites with Nation", Fuel Cells, vol. 2, Sep. 24, 2002, p. 46-51.

Wikipedia, et al., "Fullerene", Nov. 1, 2020, p. 4 (retrieved Jul. 30, 2021) from website https://en.wikipedia.org/w/index.php?title=Fulleren&oldid=986547935.

* cited by examiner

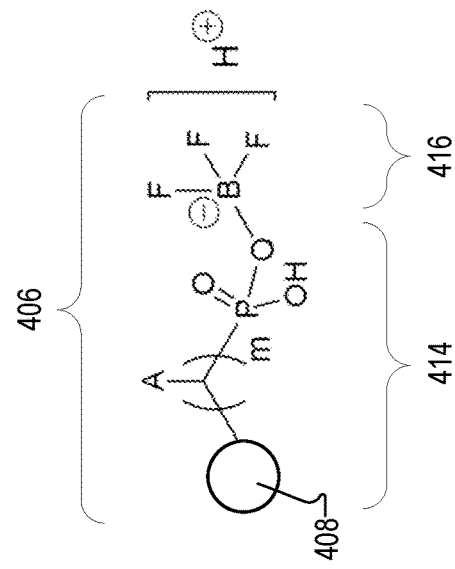
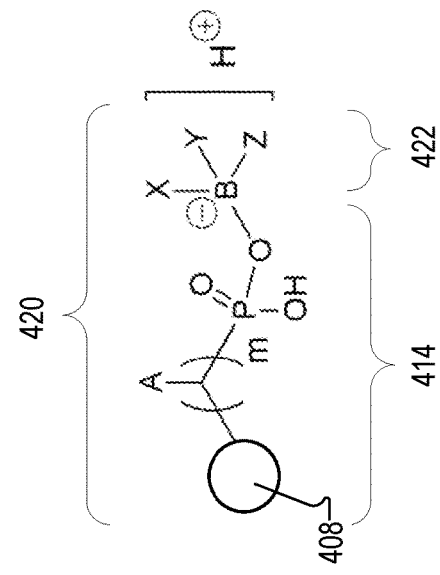
FIG. 4A
FIG. 4B

TETRAVALENT BORON-CONTAINING PROTON-EXCHANGE SOLID SUPPORTS AND METHODS OF MAKING AND USING TETRAVALENT BORON-CONTAINING PROTON-EXCHANGE SOLID SUPPORTS

RELATED APPLICATIONS

The present application is a continuation of International Patent Application No. PCT/US2021/038956, filed Jun. 24, 2021, which claims priority to U.S. Provisional Patent Application No. 63/109,943, filed Nov. 5, 2020, and to International Patent Application No. PCT/US2021/029705, filed Apr. 28, 2021, which also claims priority to U.S. Provisional Patent Application No. 63/109,943, filed Nov. 5, 2020, the contents of which are hereby incorporated by reference in their entireties.

BACKGROUND INFORMATION

Proton-exchange solid supports may be used in proton exchange membranes (PEMs), which are semipermeable membranes that are engineered to transport protons ($H^+$) while being impermeable to gases such as hydrogen ($H_2$) and oxygen ($O_2$). PEMs may be used in hydrogen fuel cells and water electrolysis systems under acidic conditions. PEMs may be composed of a mechanically and chemically resistant particles and/or a porous framework with highly acidic functional groups. For example, Nafion-based proton exchange membranes contain a polytetrafluoroethylene (PTFE) porous structural framework with sulfonic acid groups. The easily dissociable sulfonic acid groups serve as proton transport agents in the membrane.

SUMMARY

The following description presents a simplified summary of one or more aspects of the methods and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative examples, a boron-containing proton-exchange solid support comprises a proton-exchange solid support comprising an oxygen atom and a tetravalent boron-based acid group comprising a boron atom covalently bonded to the oxygen atom.

In some illustrative examples, a boron-containing proton-exchange solid support has general formula (Ia), (Ib), (Ic), or (Id):

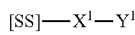 (Ia)

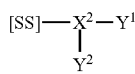 (Ib)

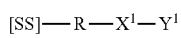 (Ic)

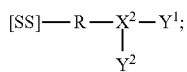 (Id)

wherein:

[SS] represents a solid support;

$X^1$ represents a substituent group having formula (IIa), (IIb), (IIc), or (IId):

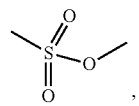 (IIa)

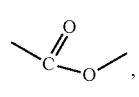 (IIb)

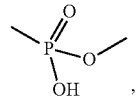 (IIc)

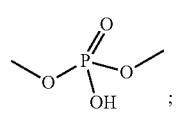 (IId)

$X^2$ represents a group having formula (IIIa) or (IIIb):

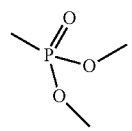 (IIIa)

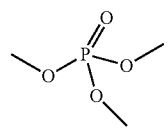 (IIIb)

$Y^1$ and $Y^2$ are the same or different and each represent a tetravalent boron-based acid group having formula (IV):

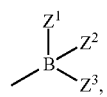 (IV)

where the boron (B) atom of formula (IV) is covalently bonded to the oxygen (O) atom of $X^1$ or $X^2$, and $Z^1$, $Z^2$, and $Z^3$ are the same or different and each represents an alkyl group, an alkoxy group, an alkyloxycarbonyl group, an aryl group, an aryloxy group, or a fluoro group; and R represents a $C_1$ to $C_{30}$ alkyl linker chain and optionally has one or more pendant moieties, which may be the same or different for each atom in the linker chain and which may comprise hydrogen, a hydroxyl group, a fluoro group, a chloro group, a dialkylamino group, a cyano group, a carboxylic acid group, a carboxylic amide group, a carboxylic ester group, an alkyl group, an alkoxy group, and an aryl group.

In some illustrative examples, a method of making a boron-containing proton-exchange solid support comprises modifying a proton-exchange solid support with a tetravalent boron-based acid group.

In some illustrative examples, a membrane electrode assembly comprises a cathode, an anode, and a proton exchange membrane positioned between the cathode and the anode, the proton exchange membrane comprising a proton-exchange solid support comprising an oxygen atom and a tetravalent boron-based acid group comprising a boron atom covalently bonded to the oxygen atom.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 4A and 4B show an illustrative reaction scheme for synthesizing a boron-containing proton-exchange solid support presenting a tetravalent boron-based acid group linked to a phosphorous (P) atom through an oxygen (O) atom.

DETAILED DESCRIPTION

Figure 1A:
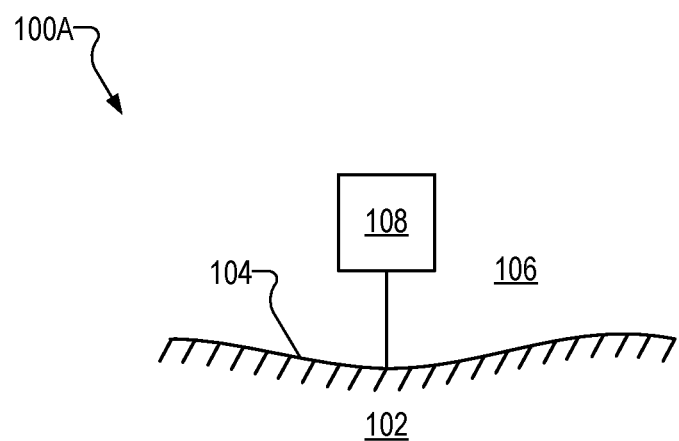
FIG. 1A shows an illustrative configuration of a solid support implemented as a porous structural framework.

Herein described are tetravalent boron-containing proton-exchange solid supports, apparatuses including tetravalent boron-containing proton-exchange solid supports, and methods of making and using tetravalent boron-containing proton-exchange solid supports. In some examples, a tetravalent boron-containing proton-exchange solid support comprises a proton-exchange solid support comprising an oxygen atom, and a tetravalent boron-based acid group comprising a boron atom covalently bonded to the oxygen atom. In some examples, the boron-containing proton-exchange solid support further comprises a sulfur atom, a carbon atom, or a phosphorous atom covalently bonded to the oxygen atom. The proton-exchange solid support may be formed of an amorphous or crystalline inorganic material and/or a synthetic or natural polymer, and may be, for example, in the form of a porous polymer network, a microparticle, or a nanoparticle.

The tetravalent boron-containing proton-exchange solid supports described herein are superacids with strong proton exchange properties. Electrically neutral boron has three valence electrons but can also form a tetravalent ion with a negative formal charge by covalently bonding with four other atoms. Thus, the tetravalent boron-based acid groups are intrinsically ionic and may serve as proton transport agents. The tetravalent boron-containing proton-exchange solid supports described herein may be used in PEMs for water electrolysis and/or fuel cell applications operating under acidic conditions. For example, in boron-containing PEMs described herein, cation (e.g., proton) exchange is provided by protons ionically linked to the tetravalent, negatively charged boron atoms. The presence of the oxygen-boron bonds increases the hydrophilicity of the boron-containing PEMs and stabilizes the negatively charged boron atoms. The boron-containing PEMs described herein also have high mechanical strength, high proton conductivity, low electron conductivity, chemical stability under a large pH gradient, durability, and low cost of production. In some examples, the boron-containing PEMs described herein also do not incorporate toxic materials. Implementations and uses of tetravalent boron-containing proton-exchange solid supports in PEMs will be described below in more detail.

The tetravalent boron-containing proton-exchange solid supports described herein may also be used for filtering and/or neutralizing pathogens such as bacteria, viruses, and fungal spores. For example, tetravalent boron-containing proton-exchange porous membranes may be implemented in face masks, surgical masks, air filters, and air purification systems for enclosed spaces (e.g., homes, offices, hospitals, factories, vehicles, airplanes, etc.).

The compositions, apparatuses, and methods described herein may provide one or more of the benefits mentioned above and/or various additional and/or alternative benefits that will be made apparent herein. Various embodiments will now be described in more detail with reference to the figures. It will be understood that the following embodiments are merely illustrative and are not limiting, as various modifications may be made within the scope of the present disclosure.

An illustrative tetravalent boron-containing proton-exchange solid support comprises a proton-exchange solid support comprising a sulfur atom, a carbon atom, or a phosphorous atom covalently bonded to an oxygen atom, and one or more tetravalent boron-based acid groups each comprising a boron atom covalently bonded to the oxygen atom. An illustrative tetravalent boron-containing proton-exchange solid support may have the general formula (Ia) or (Ib):

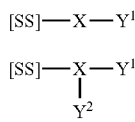

wherein [SS] represents a solid support; X is a substituent group containing an oxygen (O) atom or a sulfur (S) atom, a carbon (C) atom, or a phosphorous (P) atom covalently bonded to one or more oxygen (O) atoms; and $Y^1$ and $Y^2$ each represent a tetravalent boron-based acid group comprising a boron (B) atom covalently bonded to the oxygen atom of substituent group X. As will be explained below in more detail, substituent group X may be derived from a precursor substituent group containing a hydroxyl group, such as a hydroxyl group, an acid group (e.g., a phenol group or an oxoacid such as a carboxylic acid group, a sulfonic acid group (e.g., a sulfo group), a phosphonic acid group, or a phosphate group), or an alcohol. Optionally, a tetravalent boron-containing proton-exchange solid support may include a linker chain that links substituent group X with solid support [SS]. For example, a tetravalent boron-containing proton-exchange solid support may have the general formula (Ic) or (Id):

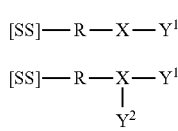

where R represents a $C_1$ to $C_{30}$ alkyl linker chain and optionally has one or more pendant moieties, which may be the same or different and may each be independently selected from the group consisting of hydrogen, a hydroxyl group, a fluoro group, a chloro group, a dialkylamino group, a cyano group, a carboxylic acid group, a carboxylic amide group, an ester group, an alkyl group, an alkoxy group, and an aryl group.

Solid support [SS], substituent group X, and optionally linker chain R, in combination, are referred to herein as a proton-exchange solid support because this combination may be derived from a precursor proton-exchange solid support. For example, as will be explained below in more detail, the proton-exchange solid support ([SS]-X or [SS]-R-X), prior to modification with tetravalent boron-based acid group $Y^1$ and/or $Y^2$, may be a commercially-available ionomer (e.g., a sulfonic acid-functionalized PTFE) and may itself serve as a proton transport agent by dissociation of a precursor of substituent group X (e.g., a carboxylic acid group, a sulfonic acid group, a phosphonic acid group, a phosphate group, a phenol group, an alcohol group, or a hydroxyl group).

Solid support [SS] may be formed of any suitable material or combination of materials, including inorganic materials and/or organic materials. Suitable inorganic materials may include amorphous inorganic materials (e.g., glass, fused silica, or ceramics) and/or crystalline inorganic materials (e.g., quartz, single crystal silicon, or alumina). Suitable organic material may include, for example, synthetic and/or natural polymers (e.g., lignin, cellulose, chitin, etc.), ionomers, and the like. In some examples, substituent group X is linked to a side chain of solid support [SS] or comprises a side chain of solid support [SS].

Solid support [SS] and/or the proton-exchange solid support of formulas (Ia)-(Id) (e.g., [SS]-X or [SS]-R-X) may have any suitable shape and form, such as a porous structural framework or a solid support particle. A porous structural framework may be, for example, a porous polymer network. FIG. 1A shows an illustrative configuration 100A of a porous structural framework 102. As shown, a pore surface 104 adjacent to a pore 106 is functionalized with a tetravalent boron-based acid group 108 (e.g., $Y^1$ or $Y^2$). While FIG. 1A shows only one tetravalent boron-based acid group 108 bonded to pore surface 104, porous structural framework 102 may have any other number and concentration of tetravalent boron-based acid groups 108 bonded to pore surface 104.

Figure 1B:
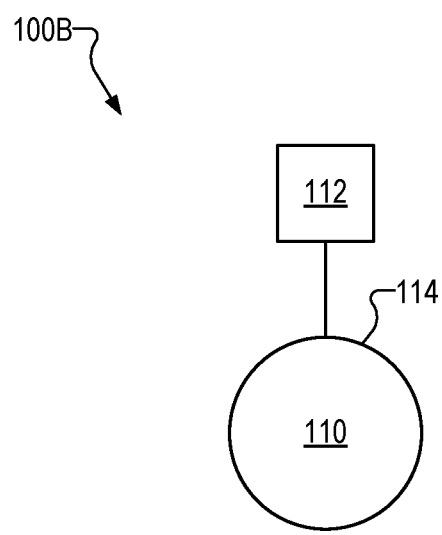
FIG. 1B shows another illustrative configuration of a solid support implemented as a solid support particle.

A solid support particle may include, for example, a microparticle, a nanoparticle, and/or a resin bead. FIG. 1B shows an illustrative configuration 100B in which the proton-exchange solid support of formulas (Ia)-(Id) (e.g., [SS]-X or [SS]-R-X) is implemented as a solid support particle 110. A boron-based acid group 112 is bonded to a surface 114 of solid support particle 110. In some examples (not shown), multiple solid support particles 110 may be linked together to form a porous structural framework (e.g., porous structural framework 102) with boron-based acid groups 112 bonded to pore surfaces (e.g., surfaces 114) within the porous structural framework.

Solid support particles 110 may be formed of any suitable material, such as any material described above for porous structural framework 102, such as inorganic molecules (e.g., fused silica particles, ceramic particles, etc.) or natural or synthetic organic molecules (e.g., polymers). Solid support particles 110 may have any suitable shape and size, ranging from tens of nanometers (nm) to hundreds of microns. The porosity of a porous structural framework formed by solid support particles 110 may be controlled and defined by the size and/or shape of solid support particles 110. Solid support particles 110 may also be selected for their mechanical strength, their durability in an environment with a high pH gradient, and/or for their affinity to water (e.g., they may be chosen to be hydrophilic or hydrophobic depending on the desired water-affinity balance).

Referring again to formulas (Ia) to (Id), substituent group X contains an oxygen (O) atom or a sulfur (S) atom, a carbon (C) atom, or a phosphorous (P) atom covalently bonded to one or more oxygen (O) atoms. In some examples, substituent group X is a derivative of a precursor substituent group containing a hydroxyl group, such as a pendant hydroxyl group linked to solid support [SS], a pendant acid group linked to solid support [SS] (such as a sulfonic acid group, a sulfuric acid group, a carboxylic acid group, a carbonic acid group, a phosphonic acid group, a phosphoric acid group, or a phenol group), or an alcohol linked to solid support [SS]. In some examples, substituent group X contains a sulfur atom, a carbon atom, or a phosphorous atom covalently bonded to an oxygen atom and covalently bonded to an additional oxygen atom by a double bond. Examples of substituent group X may include, without limitation, an oxygen atom (O) (derived from a pendant hydroxyl group), a carboxylate ester (C(=O)O), a carbonate ester (OC(=O)O), a sulfonate ester (S(=O)$_2$O), a sulfate ester (OS(=O)$_2$O), a phosphoryl group (P(=O)(OH)O or P(=O)O$_2$), and a phosphate group (OP(=O)O$_2$), an aryloxy group (OAr) (e.g., phenoxy group), or an alkoxy group (OR). Further examples of substituent group X are shown in the illustrative reaction schemes described below with reference to FIGS. 2A to 8B.

Tetravalent boron-containing acid groups $Y^1$ and $Y^2$ may be the same or different and are represented by general formula (IV):

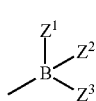
(IV)

where the boron (B) atom is covalently bonded to the oxygen (O) atom (not shown in formula IV) of substituent group X derived from the precursor hydroxyl group. For example, when substituent X is a derivative of a precursor acid group containing a sulfur (S) atom, a carbon (C) atom, or a phosphorous (P) atom, the boron (B) atom is covalently bonded to the oxygen (O) atom that is covalently bonded to the sulfur (S) atom, carbon (C) atom, or phosphorous (P) atom of substituent group X. Substituents $Z^1$, $Z^2$, and $Z^3$ are the same or different and each represents an alkyl group, an alkoxy group, an alkyloxycarbonyl group, an aryl group, an aryloxy group, a hydroxyl group, or a fluoro group. In some examples, groups $Y^1$ and/or $Y^2$ may be an ester represented by formula (Va), (Vb), or (Vc):

(Va)

(Vb)

(Vc)

where R', R", and R'" may be the same or different and may represent, for example, an alkyl group, an alkoxy group, an alkyloxycarbonyl group, an aryl group, or an aryloxy group. In yet further examples, $Y^1$ and/or $Y^2$ are derived from boron trifluoride (i.e., $Z^1$, $Z^2$, and $Z^3$ are each a fluoro group (F)). Other examples of $Y^1$ and $Y^2$ are shown and described in the illustrative reaction schemes described below with reference to FIGS. 2A to 8B.

A tetravalent boron-containing proton-exchange solid support may be synthesized in any suitable way. In some examples, a tetravalent boron-containing proton-exchange solid support may be synthesized by combining a proton-exchange solid support with boron trifluoride ($BF_3$) or a boron-based ester (e.g., a trivalent boron-based ester), as will now be shown and described with reference to FIGS. 2A-8B. The following reaction schemes are merely illustrative and are not limiting.

Figure 2A:
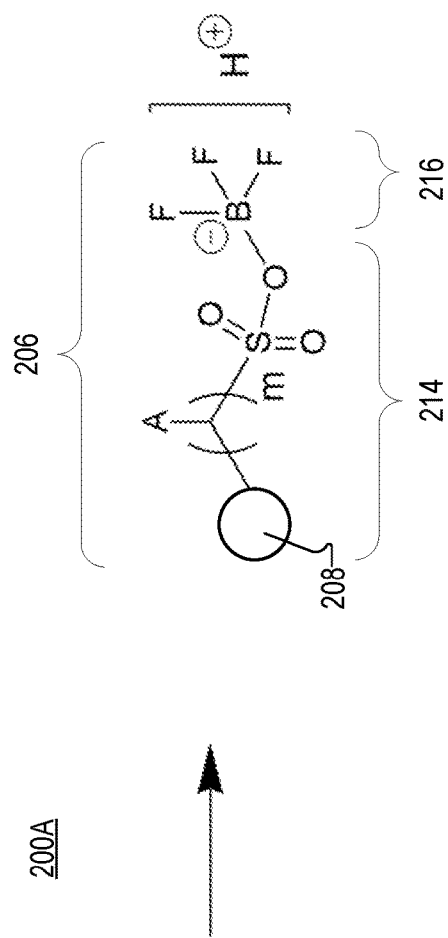
FIGS. 2A and 2B show illustrative reaction schemes for synthesizing a boron-containing proton-exchange solid support presenting a tetravalent boron-based acid group linked to a sulfur (S) atom through an oxygen (O) atom.
Figure 2A:
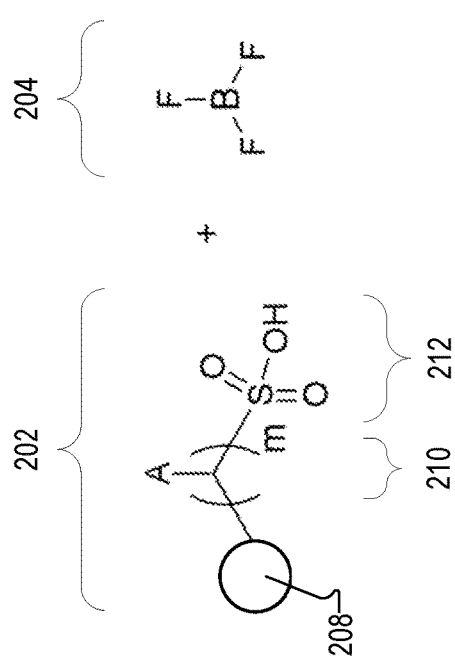

FIG. 2A shows an illustrative reaction scheme 200A for synthesizing a boron-containing proton-exchange solid support presenting a tetravalent boron-based acid group linked to a sulfur (S) atom through an oxygen (O) atom. As shown, a proton-exchange solid support 202 is modified with boron trifluoride 204 to produce boron-containing proton-exchange solid support 206. Boron trifluoride 204 may be used in the synthesis reaction in a diethyl ether and/or tetrahydrofuran complex. Boron trifluoride is a Lewis acid and is a stronger acid than boric acids and boronic acids due to the presence of three boron-fluorine bonds, with fluorine being the most electronegative element in the periodic table.

Proton-exchange solid support 202 includes a solid support 208, a linker chain 210, and a sulfonic acid group 212. However, linker chain 210 is optional and may be omitted in other examples. Solid support 208 may be implemented by any suitable solid support, including any solid support described herein (e.g., solid support [SS] of formulas (Ia)-(Id)) and may be implemented in any suitable form, including as a porous structural framework (e.g., porous structural framework 102) or a solid support particle (e.g., solid support particle 110). In some examples, proton-exchange solid support 202 comprises a sulfonic acid-functionalized polymer, such as a poyfluorosulfonic acid polymer, a perfluorinated sulfonic acid polymer, or a sulfonated PTFE based fluoropolymer-copolymer. Examples of proton-exchange solid support 202 may include, without limitation, ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene and tetrafluoroethylene-perfluoro-3,6-dioxa-4-methyl-7-octenesulfonic acid copolymer. Commercially available sulfonic acid-functionalized polymers include, without limitation, Nafion® (available from E.I. Dupont de Nemours and Company in various configurations and grades, including Nafion-H, Nafion HP Nafion 117, Nafion 115, Nafion 212, Nafion 211, Nafion NE1035, Nafion XL, etc.), Aquivion® (available from Solvay S.A. in different configurations and grades, including Aquivion® E98-05, Aquivion® PW98, Aquivion® PW87S, etc.), Gore-Select® (available from W.L. Gore & Associates, Inc.), Flemion™ (available from Asahi Glass Company), Pemion+™ (available from Ionomr Innovations, Inc.), and any combination, derivative, grade, or configuration thereof.

Linker chain 210 may be any suitable substituent group capable of linking sulfonic acid group 212 to solid support 208. Linker chain 210 may be implemented by any suitable linker chain, including any linker chain described herein (e.g., linker chain R of formulas (Ia)-(Id)). In some examples, linker chain 210 contains carbon, oxygen, and/or nitrogen. As shown in FIG. 2A, linker chain 210 is an alkyl chain of length m, where m ranges from 1 to 30, and has one or more side groups A, each of which may independently be hydrogen (H), a hydroxyl group (OH), a fluoro group (F), a chloro group (Cl), a dialkylamino group ($NR_2$, in which R may represent hydrogen or an organic combining group, such as a methyl group ($CH_3$)), a cyano group (CN), a carboxylic acid (COOH) group, a carboxylic amide group, an ester group, an alkyl group, an alkoxy group, and an aryl group.

Figure 2B:
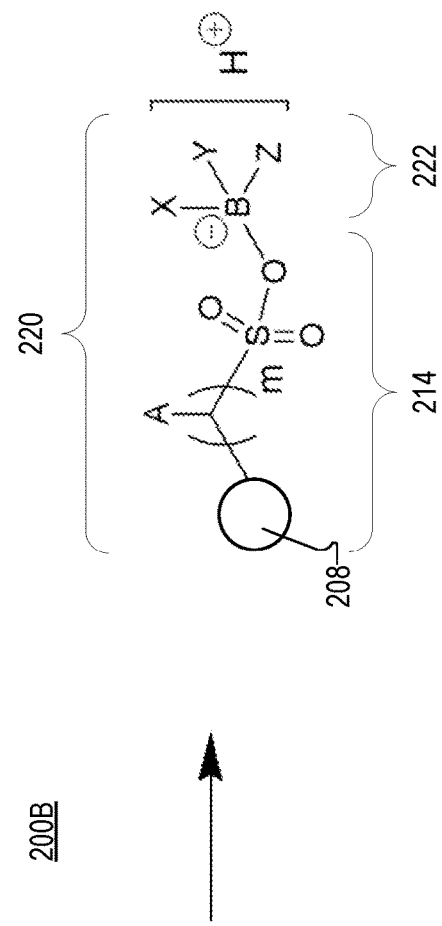
Figure 2B:
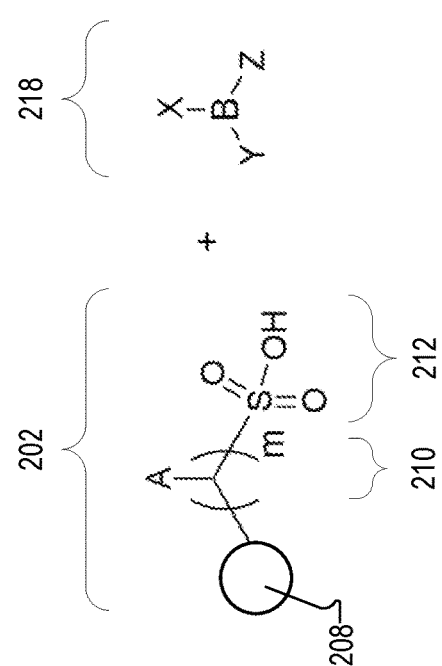

In some examples, boron trifluoride 204 and sulfonic acid group 212 are combined in approximately a one-to-one (1:1) stoichiometric ratio, although they may be combined in any other suitable ratio. The resulting boron-containing proton-exchange solid support 206 includes a proton-exchange solid support 214 comprising a sulfur atom covalently bonded to an oxygen atom, and a tetravalent boron-based acid group 216 comprising a boron atom covalently bonded to the oxygen atom. Boron-containing proton-exchange solid support 206 is a superacid with strong proton exchange properties. As mentioned above, electrically neutral boron has three valence electrons but can also form a tetravalent ion with a negative formal charge by covalently bonding with four other atoms, as shown in FIG. 2B. Thus, tetravalent boron-based acid group 216 is intrinsically ionic and may serve as a proton transport agent.

FIG. 2B shows another illustrative reaction scheme 200B for synthesizing a boron-containing proton-exchange solid support presenting a tetravalent boron-based acid group linked to a sulfur (S) atom through an oxygen (O) atom. Reaction scheme 200B is similar to reaction scheme 200A except that in reaction scheme 200B proton-exchange solid support 202 is combined with a boron-based ester 218 instead of with boron trifluoride 204. Boron-based ester 218 may be a borate ester or a boronic ester (also referred to as a boronate ester). A borate ester may be derived, for example, by reacting boric acid (B(OH)$_3$) or a related boron oxide with an alcohol (ROH) in the presence of heat. A boronic ester may be derived, for example, by reacting a boronic acid or a related boron oxide with an alcohol (ROH) in the presence of heat. Thus, in boron-based ester 218 of FIG. 2B, groups X, Y, and Z may each independently represent an alkoxy group (OR), an aryloxy group (OAr), an alkyl group (R), an aryl group (Ar), or a fluoro group (F), with the proviso that at least two of X, Y, and Z includes an oxygen atom bonded to the boron atom to thereby form a boron-based ester. Examples of a boron-based ester may include, without limitation, trimethyl borate, triethyl borate, tributyl borate, n-octyl borate, tridecyl borate, tritetradecyl borate, triisopropyl borate, tris(hexafluoroisopropyl) borate, trimethoxycyclotriboroxane, triphenyl borate, tri-o-tolyl borate, tris(trimethylsilyl) borate, tetraacetyl diborate, tris(2,2,2-trifluoroethyl) borate, bis-pinacol diboronate, pinacol boronate, allylboronic acid pinacol ester, and diisopropoxymethylborane.

In some examples, boron-based ester 218 and sulfonic acid group 212 are combined in approximately a one-to-one (1:1) stoichiometric ratio, although they may be combined in any other suitable ratio. The resulting boron-containing proton-exchange solid support 220 includes proton-exchange solid support 214 comprising a sulfur atom covalently bonded to an oxygen atom, and a tetravalent boron-based acid group 222 comprising a boron atom covalently bonded to the oxygen atom. Like boron-containing proton-exchange solid support 206, boron-containing proton-exchange solid support 220 is a superacid with strong proton exchange properties and is intrinsically ionic.

Figure 3A:
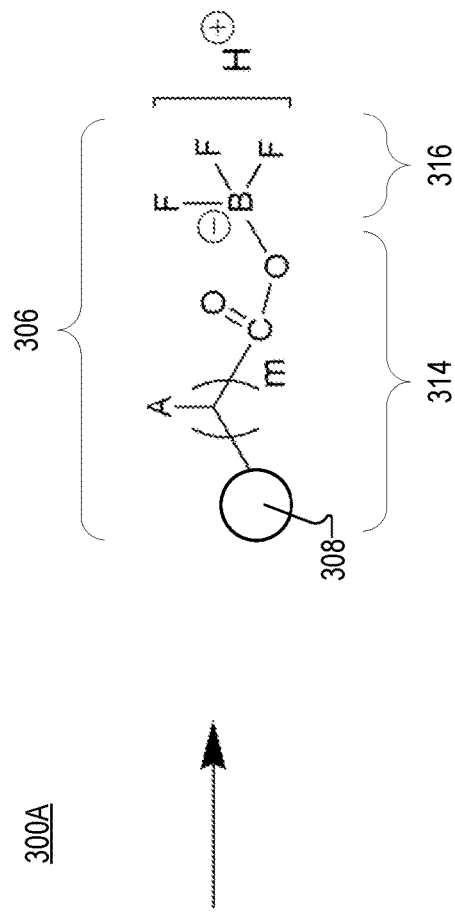
FIGS. 3A and 3B show illustrative reaction schemes for synthesizing a boron-containing proton-exchange solid support presenting a tetravalent boron-based acid group linked to a carbon (C) atom through an oxygen (O) atom.

FIG. 3A shows an illustrative reaction scheme 300A for synthesizing a boron-containing proton-exchange solid support presenting a tetravalent boron-based acid group linked to a carbon (C) atom through an oxygen (O) atom. As shown, a proton-exchange solid support 302 is modified with boron trifluoride 304 to produce boron-containing proton-exchange solid support 306. Boron trifluoride may be used in the synthesis reaction in a diethyl ether and/or tetrahydrofuran complex.

Proton-exchange solid support 302 includes a solid support 308, a linker chain 310, and a carboxylic acid group 312. However, linker chain 310 is optional and may be omitted in other examples. Solid support 308 may be implemented by any suitable solid support, including any solid support described herein (e.g., solid support [SS] of formulas (Ia)-(Id)) and may be implemented in any suitable form, including as a porous structural framework (e.g., porous structural framework 102) or a solid support particle (e.g., solid support particle 110). In some examples, proton-exchange solid support 302 comprises a carboxylic acid-functionalized polymer, such as a polyacrylic acid polymer.

Linker chain 310 may be any suitable substituent group capable of linking carboxylic acid group 312 to solid support 308. Linker chain 310 may be implemented by any suitable linker chain, including any linker chain described herein (e.g., linker chain R of formulas (Ia)-(Id)). Linker chain 310 may be the same as or similar to linker chain 210.

In some examples, boron trifluoride 304 and carboxylic acid group 312 are combined in approximately a one-to-one (1:1) stoichiometric ratio, although they may be combined in any other suitable ratio. The resulting boron-containing proton-exchange solid support 306 includes a proton-exchange solid support 314 comprising a carbon atom covalently bonded to an oxygen atom, and a tetravalent boron-based acid group 316 comprising a boron atom covalently bonded to the oxygen atom. Boron-containing proton-exchange solid support 306 is a superacid with strong proton exchange properties and is intrinsically ionic.

Figure 3B:
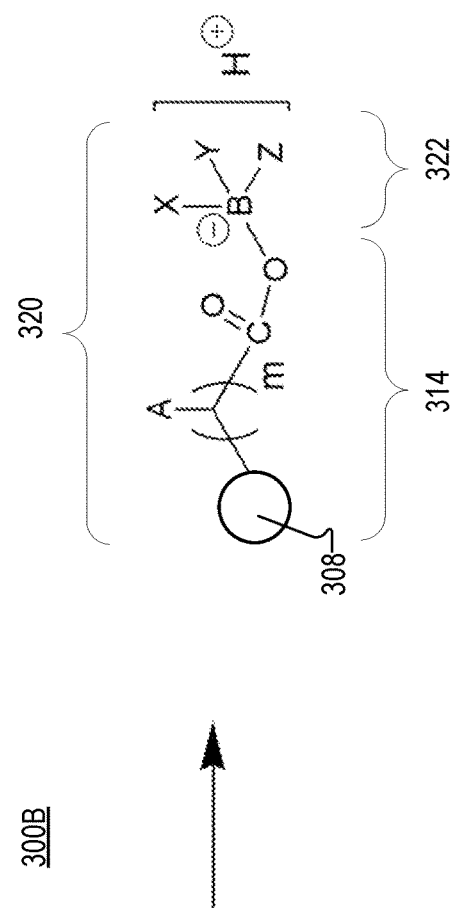

FIG. 3B shows another illustrative reaction scheme 300B for synthesizing a boron-containing proton-exchange solid support presenting a tetravalent boron-based acid group linked to a carbon (C) atom through an oxygen (O) atom. Reaction scheme 300B is similar to reaction scheme 300A except that in reaction scheme 300B proton-exchange solid support 302 is combined with a boron-based ester 318 instead of with boron trifluoride 304. Boron-based ester 318 may be the same as or similar to boron-based ester 218.

In some examples, boron-based ester 318 and carboxylic acid group 312 are combined in approximately a one-to-one (1:1) stoichiometric ratio, although they may be combined in any other suitable ratio. The resulting boron-containing proton-exchange solid support 320 includes proton-exchange solid support 314 comprising a carbon atom covalently bonded to an oxygen atom, and a tetravalent boron-based acid group 322 comprising a boron atom covalently bonded to the oxygen atom. Like boron-containing proton-exchange solid support 306, boron-containing proton-exchange solid support 320 is a superacid with strong proton exchange properties and is intrinsically ionic.

FIG. 4A shows an illustrative reaction scheme 400A for synthesizing a boron-containing proton-exchange solid support presenting a tetravalent boron-based acid group linked to a phosphorous (P) atom through an oxygen (O) atom. As shown, a proton-exchange solid support 402 is modified with boron trifluoride 404 to produce boron-containing proton-exchange solid support 406. Boron trifluoride may be used in the synthesis reaction in a diethyl ether and/or tetrahydrofuran complex.

Proton-exchange solid support 402 includes a solid support 408, a linker chain 410, and a phosphonic acid group 412. However, linker chain 410 is optional and may be omitted in other examples. Solid support 408 may be implemented by any suitable solid support, including any solid support described herein (e.g., solid support [SS] of formulas (Ia)-(Id)) and may be implemented in any suitable form, including as a porous structural framework (e.g., porous structural framework 102) or a solid support particle (e.g., solid support particle 110). In some examples, proton-exchange solid support 402 comprises a phosphonic acid-functionalized polymer, such as a polyvinylphosphonic acid (PVPA) polymer.

Linker chain 410 may be any suitable substituent group capable of linking phosphonic acid group 412 to solid support 408. Linker chain 410 may be implemented by any suitable linker chain, including any linker chain described herein (e.g., linker chain R of formulas (Ia)-(Id)). Linker chain 410 may be the same as or similar to linker chain 210.

In some examples, boron trifluoride 404 and phosphonic acid group 412 are combined in approximately a one-to-one (1:1) stoichiometric ratio, although they may be combined in any other suitable ratio. The resulting boron-containing proton-exchange solid support 406 includes a proton-exchange solid support 414 comprising a phosphorous atom covalently bonded to an oxygen atom, and a tetravalent boron-based acid group 416 comprising a boron atom covalently bonded to the oxygen atom. Boron-containing proton-exchange solid support 406 is a superacid with strong proton exchange properties and is intrinsically ionic.

FIG. 4B shows another illustrative reaction scheme 400B for synthesizing a boron-containing proton-exchange solid support presenting a tetravalent boron-based acid group linked to a phosphorous (P) atom through an oxygen (O) atom. Reaction scheme 400B is similar to reaction scheme 400A except that in reaction scheme 400B proton-exchange solid support 402 is combined with a boron-based ester 418 instead of with boron trifluoride 404. Boron-based ester 418 may be the same as or similar to boron-based ester 218.

In some examples, boron-based ester 418 and phosphonic acid group 412 are combined in approximately a one-to-one (1:1) stoichiometric ratio, although they may be combined in any other suitable ratio. The resulting boron-containing proton-exchange solid support 420 includes proton-exchange solid support 414 comprising a phosphorous atom covalently bonded to an oxygen atom, and a tetravalent boron-based acid group 422 comprising a boron atom covalently bonded to the oxygen atom. Like boron-containing proton-exchange solid support 406, boron-containing proton-exchange solid support 420 is a superacid with strong proton exchange properties and is intrinsically ionic.

Figure 5A:
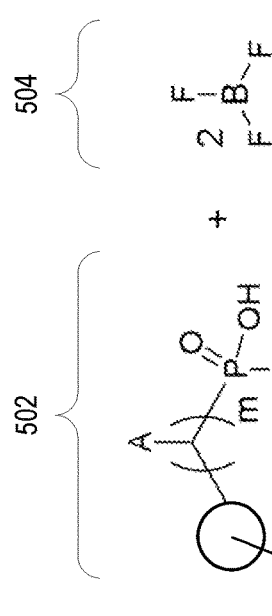
FIGS. 5A and 5B show an illustrative reaction scheme for synthesizing a boron-containing proton-exchange solid support presenting two tetravalent boron-based acid groups linked to a phosphorous (P) atom through a single oxygen (O) atom.
Figure 5A:
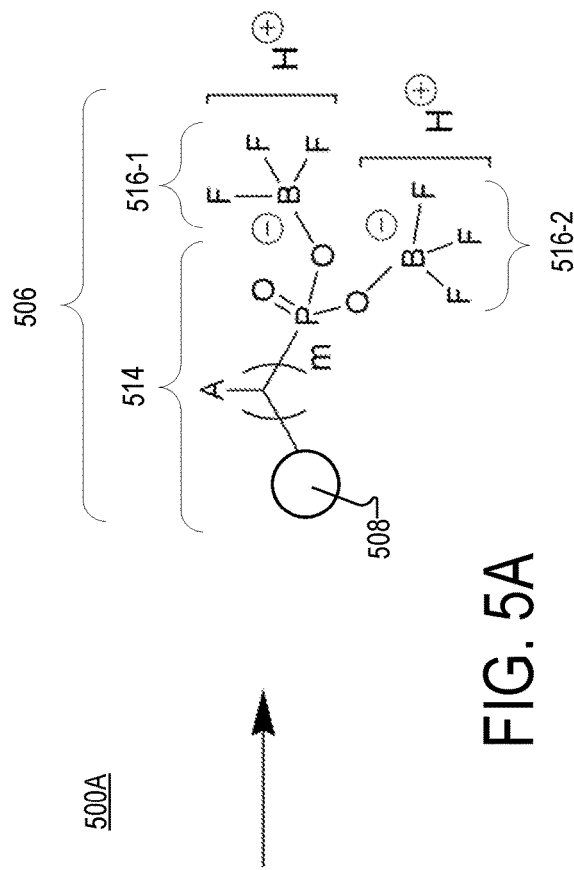

FIG. 5A shows an illustrative reaction scheme 500A for synthesizing a boron-containing proton-exchange solid support presenting two tetravalent boron-based acid groups each linked to the same phosphorous (P) atom through different oxygen (O) atoms. As shown, a proton-exchange solid support 502 is modified with boron trifluoride 504 to produce boron-containing proton-exchange solid support 506. Boron trifluoride may be used in the synthesis reaction in a diethyl ether and/or tetrahydrofuran complex.

Proton-exchange solid support 502 includes a solid support 508, a linker chain 510, and a phosphonic acid group 512. However, linker chain 510 is optional and may be omitted in other examples. Solid support 508 may be implemented by any suitable solid support, including any solid support described herein (e.g., solid support [SS] of formulas (Ia)-(Id)) and may be implemented in any suitable form, including as a porous structural framework (e.g., porous structural framework 102) or a solid support particle (e.g., solid support particle 110). In some examples, proton-exchange solid support 502 comprises a phosphonic acid-functionalized polymer, such as PVPA polymer.

Linker chain 510 may be any suitable substituent group capable of linking phosphonic acid group 512 to solid support 508. Linker chain 510 may be implemented by any suitable linker chain, including any linker chain described herein (e.g., linker chain R of formulas (Ia)-(Id)). Linker chain 510 may be the same as or similar to linker chain 210.

In some examples, boron trifluoride 504 and phosphonic acid group 512 are combined in approximately a two-to-one (2:1) stoichiometric ratio, although they may be combined in any other suitable ratio. The resulting boron-containing proton-exchange solid support 506 includes a proton-exchange solid support 514 comprising a phosphorous atom and two tetravalent boron-based acid groups 516-1 and 516-2 each comprising a boron atom covalently bonded to different oxygen atoms of proton-exchange solid support 506 (e.g., to different oxygen atoms of phosphonic acid group 512). Boron-containing proton-exchange solid support 506 is a superacid with strong proton exchange properties and is intrinsically ionic.

Figure 5B:
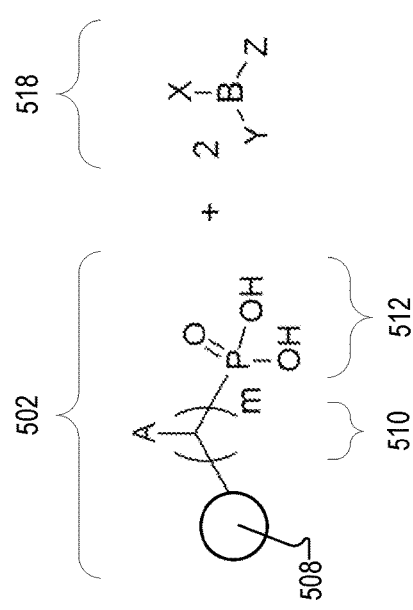
Figure 5B:
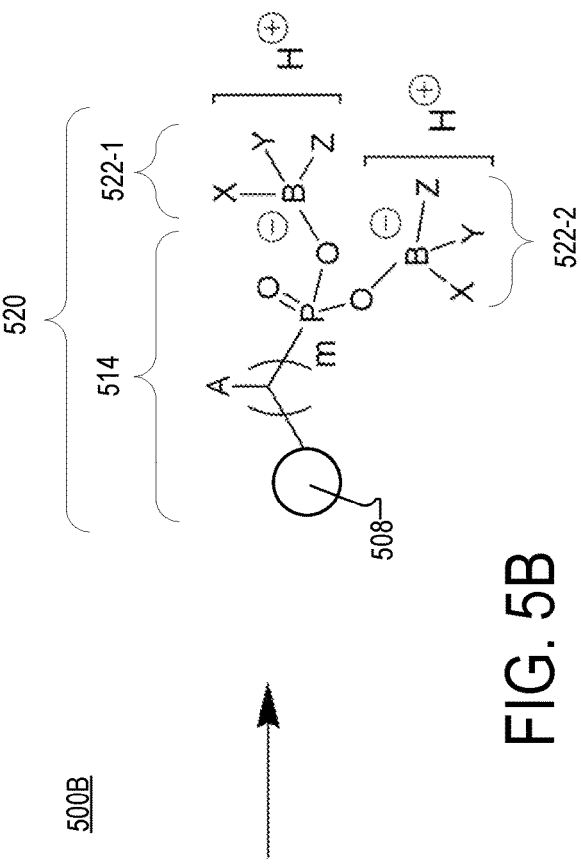

FIG. 5B shows another illustrative reaction scheme 500B for synthesizing a boron-containing proton-exchange solid support presenting two tetravalent boron-based acid groups each linked to the same phosphorous (P) atom through two different oxygen (O) atoms. Reaction scheme 500B is similar to reaction scheme 500A except that in reaction scheme 500B proton-exchange solid support 502 is combined with a boron-based ester 518 instead of with boron trifluoride 504. Boron-based ester 518 may be the same as or similar to boron-based ester 218.

In some examples, boron-based ester 518 and phosphonic acid group 512 are combined in approximately a two-to-one (2:1) stoichiometric ratio, although they may be combined in any other suitable ratio. The resulting boron-containing proton-exchange solid support 520 includes proton-exchange solid support 514 comprising a phosphorous atom and two tetravalent boron-based acid groups 522-1 and 522-2 each comprising a boron atom covalently bonded to different oxygen atoms of proton-exchange solid support 520 (e.g., to different oxygen atoms of phosphonic acid group 512). Boron-containing proton-exchange solid support 506 is a superacid with strong proton exchange properties and is intrinsically ionic.

Figure 6A:
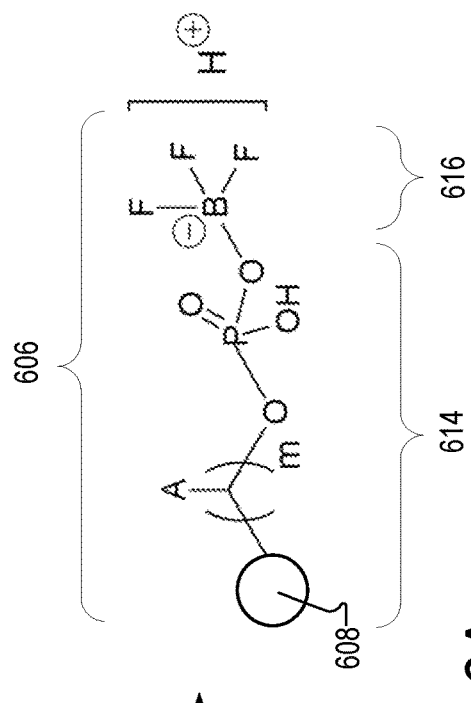
FIGS. 6A and 6B show another illustrative reaction scheme for synthesizing a boron-containing proton-exchange solid support presenting a tetravalent boron-based acid group linked to a phosphorous (P) atom through an oxygen (O) atom.
Figure 6A:
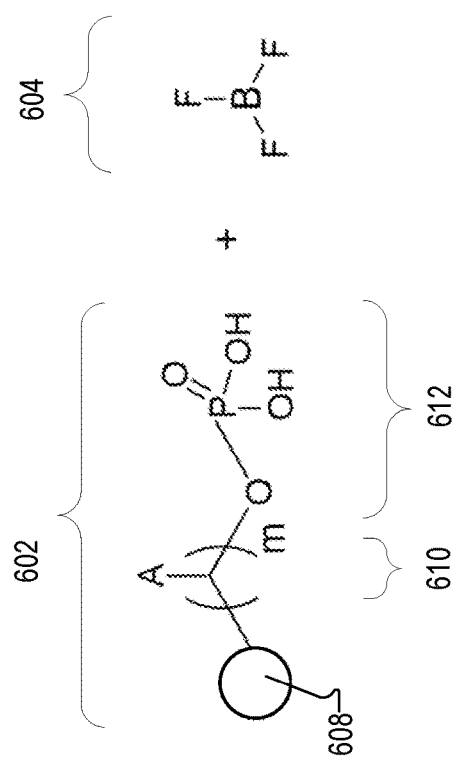

FIG. 6A shows another illustrative reaction scheme 600A for synthesizing a boron-containing proton-exchange solid support presenting a tetravalent boron-based acid group linked to a phosphorous (P) atom through an oxygen (O) atom. As shown, a proton-exchange solid support 602 is modified with boron trifluoride 604 to produce boron-containing proton-exchange solid support 606. Boron trifluoride may be used in the synthesis reaction in a diethyl ether and/or tetrahydrofuran complex.

Proton-exchange solid support 602 includes a solid support 608, a linker chain 610, and a monophosphate group 612. However, linker chain 610 is optional and may be omitted in other examples. Solid support 408 may be implemented by any suitable solid support, including any solid support described herein (e.g., solid support [SS] of formulas (Ia)-(Id)) and may be implemented in any suitable form, including as a porous structural framework (e.g., porous structural framework 102) or a solid support particle (e.g., solid support particle 110). In some examples, proton-exchange solid support 602 comprises a phosphate-functionalized polymer, such as a polybenzimidazole (PBI) doped with phosphoric acid.

Linker chain 610 may be any suitable substituent group capable of linking phosphate group 612 to solid support 608. Linker chain 610 may be implemented by any suitable linker chain, including any linker chain described herein (e.g., linker chain R of formulas (Ia)-(Id)). Linker chain 610 may be the same as or similar to linker chain 210.

In some examples, boron trifluoride 604 and phosphate group 612 are combined in approximately a one-to-one (1:1) stoichiometric ratio, although they may be combined in any other suitable ratio. The resulting boron-containing proton-exchange solid support 606 includes a proton-exchange solid support 614 comprising a phosphorous atom covalently bonded to an oxygen atom and a tetravalent boron-based acid group 616 comprising a boron atom covalently bonded to the oxygen atom. Boron-containing proton-exchange solid support 606 is a superacid with strong proton exchange properties and is intrinsically ionic.

The resulting boron-containing proton-exchange solid support 606 includes a proton-exchange solid support 614 comprising a phosphorous atom covalently bonded to an oxygen atom, and a tetravalent boron-based acid group 616 comprising a boron atom covalently bonded to the oxygen atom. Boron-containing proton-exchange solid support 606 is a superacid with strong proton exchange properties and is intrinsically ionic.

Figure 6B:
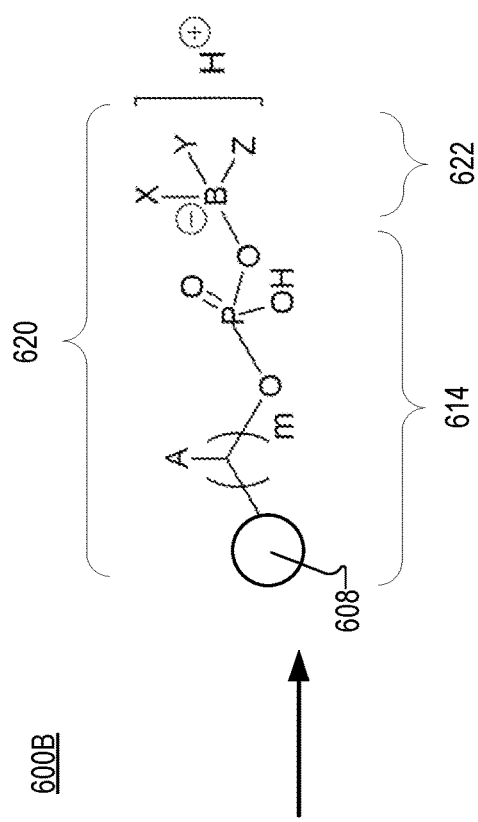
Figure 6B:
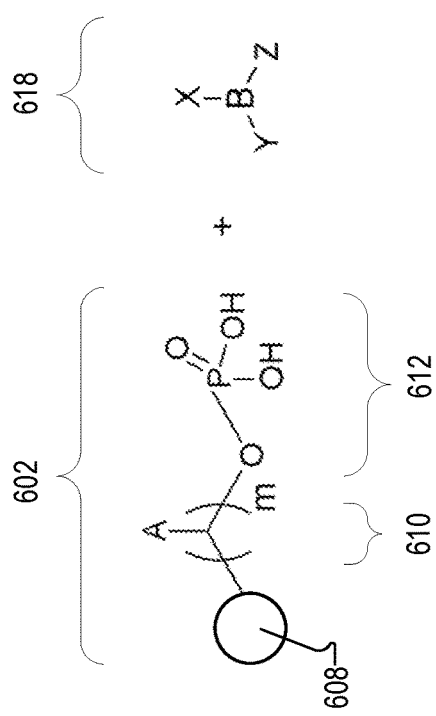

FIG. 6B shows another illustrative reaction scheme 600B for synthesizing a boron-containing proton-exchange solid support presenting a tetravalent boron-based acid group linked to a phosphorous (P) atom through an oxygen (O) atom. Reaction scheme 600B is similar to reaction scheme 600A except that in reaction scheme 600B proton-exchange solid support 602 is combined with a boron-based ester 618 instead of with boron trifluoride 604. Boron-based ester 618 may be the same as or similar to boron-based ester 218.

In some examples, boron-based ester 618 and phosphate group 612 are combined in approximately a one-to-one (1:1) stoichiometric ratio, although they may be combined in any other suitable ratio. The resulting boron-containing proton-exchange solid support 620 includes proton-exchange solid support 614 comprising a phosphorous atom covalently bonded to an oxygen atom, and a tetravalent boron-based acid group 622 comprising a boron atom covalently bonded to the oxygen atom. Like boron-containing proton-exchange solid support 606, boron-containing proton-exchange solid support 620 is a superacid with strong proton exchange properties and is intrinsically ionic.

Figure 7A:
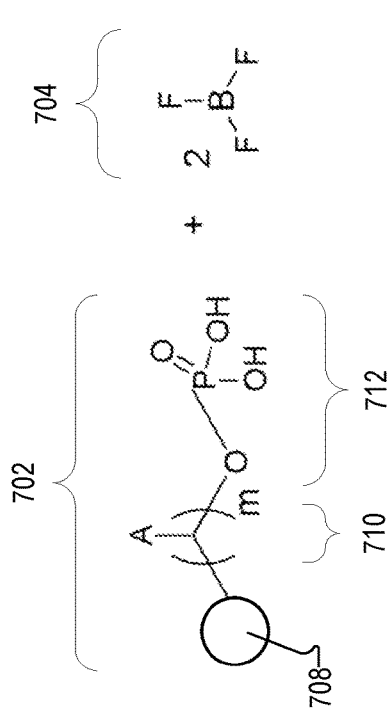
FIGS. 7A and 7B show another illustrative reaction scheme for synthesizing a boron-containing proton-exchange solid support presenting two tetravalent boron-based acid groups linked to a phosphorous (P) atom through a single oxygen (O) atom.
Figure 7A:
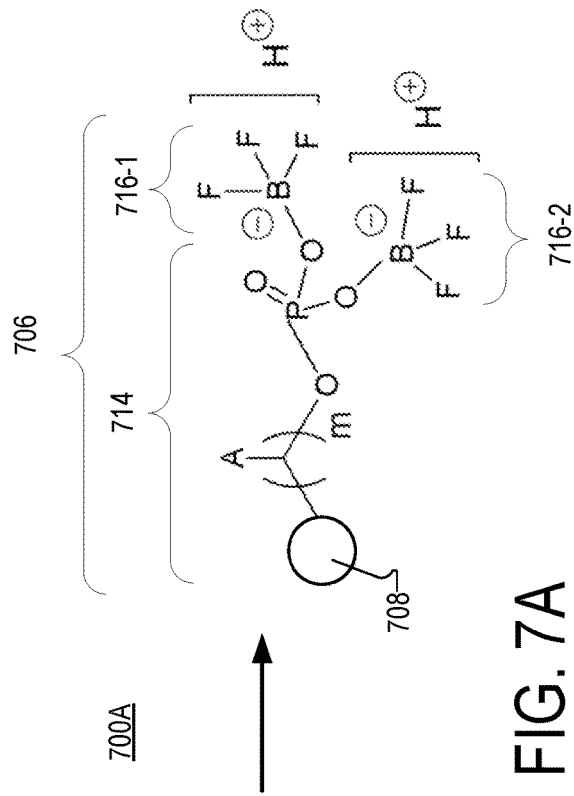

FIG. 7A shows an illustrative reaction scheme 700A for synthesizing a boron-containing proton-exchange solid support presenting two tetravalent boron-based acid groups each linked to the same phosphorous (P) atom through different oxygen (O) atoms. As shown, a phosphate-functionalized proton-exchange solid support 702 is modified with boron trifluoride 704 to produce boron-containing proton-exchange solid support 706. Boron trifluoride may be used in the synthesis reaction in a diethyl ether and/or tetrahydrofuran complex.

Proton-exchange solid support 702 includes a solid support 708, a linker chain 710, and a phosphate group 712. However, linker chain 710 is optional and may be omitted in other examples. Solid support 708 may be implemented by any suitable solid support, including any solid support described herein (e.g., solid support [SS] of formulas (Ia)-(Id)) and may be implemented in any suitable form, including as a porous structural framework (e.g., porous structural framework 102) or a solid support particle (e.g., solid support particle 110). In some examples, proton-exchange solid support 702 comprises a phosphate-functionalized polymer, such as a FBI polymer.

Linker chain 710 may be any suitable substituent group capable of linking phosphate group 712 to solid support 708. Linker chain 710 may be implemented by any suitable linker chain, including any linker chain described herein (e.g., linker chain R of formulas (Ia)-(Id)). Linker chain 710 may be the same as or similar to linker chain 210.

In some examples, boron trifluoride 704 and phosphate group 712 are combined in approximately a two-to-one (2:1) stoichiometric ratio, although they may be combined in any other suitable ratio. The resulting boron-containing proton-exchange solid support 706 includes a proton-exchange solid support 714 comprising a phosphorous atom and two tetravalent boron-based acid groups 716-1 and 716-2 each comprising a boron atom covalently bonded to different oxygen atoms of proton-exchange solid support 706 (e.g., to different oxygen atoms of phosphate group 712). Boron-containing proton-exchange solid support 706 is a superacid with strong proton exchange properties and is intrinsically ionic.

Figure 7B:
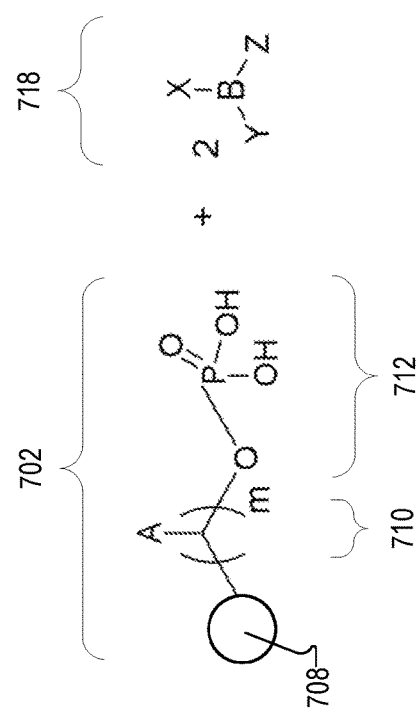
Figure 7B:
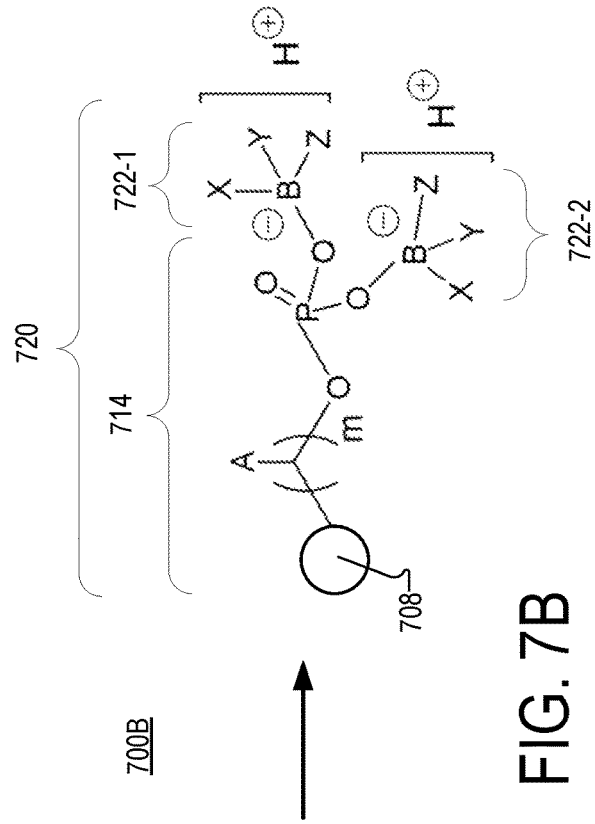

FIG. 7B shows another illustrative reaction scheme 700B for synthesizing a boron-containing proton-exchange solid support presenting two tetravalent boron-based acid groups linked to a phosphorous (P) atom through a single oxygen (O) atom. Reaction scheme 700B is similar to reaction scheme 700A except that in reaction scheme 700B proton-exchange solid support 702 is combined with a boron-based ester 718 instead of with boron trifluoride 704. Boron-based ester 718 may be the same as or similar to boron-based ester 218.

In some examples, boron-based ester 718 and phosphate group 712 are combined in approximately a two-to-one (2:1) stoichiometric ratio, although they may be combined in any other suitable ratio. The resulting boron-containing proton-exchange solid support 520 includes proton-exchange solid support 714 comprising a phosphorous atom and two tetravalent boron-based acid groups 722-1 and 722-2 each comprising a boron atom covalently bonded to different oxygen atoms of proton-exchange solid support 720 (e.g., to different oxygen atoms of phosphonic acid group 712). Boron-containing proton-exchange solid support 706 is a superacid with strong proton exchange properties and is intrinsically ionic.

Figure 8A:
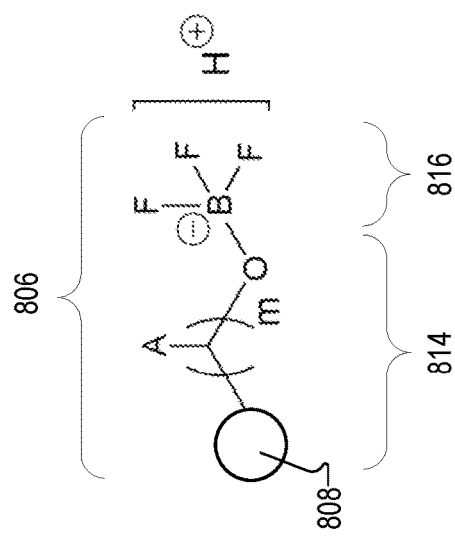
FIGS. 8A and 8B show an illustrative reaction scheme for synthesizing a boron-containing proton-exchange solid support presenting a tetravalent boron-based acid group linked to an oxygen (O) atom.

FIG. 8A shows another illustrative reaction scheme 800A for synthesizing a boron-containing proton-exchange solid support presenting a tetravalent boron-based acid group linked to an oxygen atom. As shown, a proton-exchange solid support 802 is modified with boron trifluoride 804 to produce boron-containing proton-exchange solid support 806. Boron trifluoride may be used in the synthesis reaction in a diethyl ether and/or tetrahydrofuran complex.

Proton-exchange solid support 802 includes a solid support 808, a linker chain 810, and a hydroxyl group 812. However, linker chain 810 is optional and may be omitted in other examples. Solid support 808 may be implemented by any suitable solid support, including any solid support described herein (e.g., solid support [SS] of formulas (Ia)-(Id)) and may be implemented in any suitable form, including as a porous structural framework (e.g., porous structural framework 102) or a solid support particle (e.g., solid support particle 110). In some examples, proton-exchange solid support 802 comprises a natural polymer presenting a pendant hydroxyl group, such as lignin, cellulose, or chitin.

Linker chain 810 may be any suitable substituent group capable of linking hydroxyl group 812 to solid support 808. Linker chain 810 may be implemented by any suitable linker chain, including any linker chain described herein (e.g., linker chain R of formulas (Ia)-(Id)). Linker chain 810 may be the same as or similar to linker chain 210.

In some examples, boron trifluoride 804 and hydroxyl group 812 are combined in approximately a one-to-one (1:1) stoichiometric ratio, although they may be combined in any other suitable ratio. The resulting boron-containing proton-exchange solid support 806 includes a proton-exchange solid support 814 comprising a an oxygen atom derived from hydroxyl group 812, and a tetravalent boron-based acid group 816 comprising a boron atom covalently bonded to the oxygen atom. Boron-containing proton-exchange solid support 806 is a superacid with strong proton exchange properties and is intrinsically ionic.

Figure 8B:
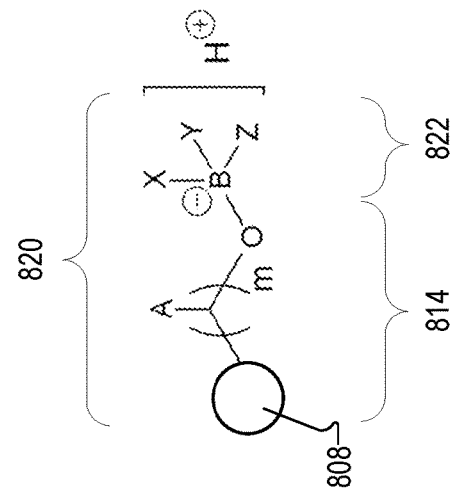

FIG. 8B shows another illustrative reaction scheme 800B for synthesizing a boron-containing proton-exchange solid support presenting a tetravalent boron-based acid group linked to an oxygen (O) atom. Reaction scheme 800B is similar to reaction scheme 800A except that in reaction scheme 800B proton-exchange solid support 802 is combined with a boron-based ester 818 instead of with boron trifluoride 804. Boron-based ester 818 may be the same as or similar to boron-based ester 218.

In some examples, boron-based ester 818 and hydroxyl group 812 are combined in approximately a one-to-one (1:1) stoichiometric ratio, although they may be combined in any other suitable ratio. The resulting boron-containing proton-exchange solid support 820 includes proton-exchange solid support 814 comprising an oxygen atom, and a tetravalent boron-based acid group 822 comprising a boron atom covalently bonded to the oxygen atom. Like boron-containing proton-exchange solid support 806, boron-containing proton-exchange solid support 820 is a superacid with strong proton exchange properties and is intrinsically ionic.

Reaction schemes 200A-800B may be used to modify a component of a PEM, including dopants, nanoparticles, microparticles, and ionomers, as well as to modify commercially available polymers and ionomers or PEMs having a pendant hydroxyl group (e.g., from a sulfonic acid group, a carboxylic acid group, a phosphonic acid group, a phosphate group, a phenol group, an alcohol, or a pendant hydroxyl group) with a tetravalent boron-based acid group. Ionomers generally include the class of polymeric materials having a pendant acid group. Therefore, when the solid support (e.g., solid support 208, optionally with linker chain 210) is a polymer and comprises a pendant acid group, a precursor proton-exchange solid support (e.g., proton-exchange solid support 202) is an ionomer due to the presence of the pending acid group (e.g., sulfonic acid group 212), as is the resulting boron-containing proton-exchange solid support (e.g., boron-containing proton-exchange solid support 206 or 220) due to the pending boron-based acid group (e.g., boron-based acid group 216 or 222). When the boron-containing proton-exchange solid support is an ionomer, a PEM may be formed by extruding or gel casting the boron-containing proton exchange solid support (e.g., boron-containing proton-exchange solid support 206 or 220). Catalyst coated membranes may also be formulated using the ionomer form of the boron-containing proton-exchange solid support as a binder for holding catalysts on both sides of the PEM.

The boron-containing proton-exchange solid supports described herein may be used in water electrolysis and/or fuel cell applications. Illustrative applications will now be described with reference to FIGS. 9-11.

Figure 9:
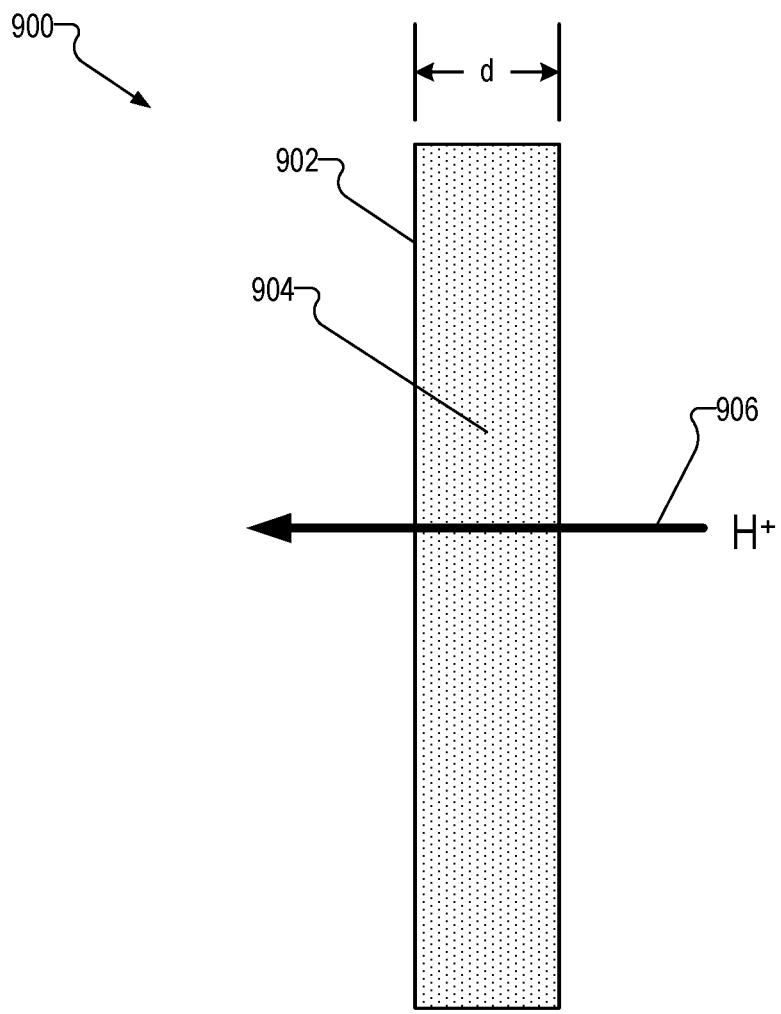
FIG. 9 shows an illustrative proton exchange membrane including a porous structural framework including boron-based acid groups bonded to pore surfaces of the porous structural framework.

In some examples, tetravalent boron-containing proton-exchange solid supports may be used in a PEM. FIG. 9 shows an illustrative proton exchange membrane 900 (PEM 900). PEM 900 includes a porous structural framework 902 and tetravalent boron-based acid groups 904 distributed throughout porous structural framework 902 and bonded to pore surfaces of porous structural framework 902.

Porous structural framework 902 may be formed of any suitable solid support or combination of solid supports described herein, including inorganic materials and/or organic materials. Suitable inorganic materials may include amorphous inorganic materials (e.g., glass, fused silica, or ceramics) and/or crystalline inorganic materials (e.g., quartz, single crystal silicon, or alumina). Suitable organic material may include, for example, synthetic and/or natural polymers (e.g., cellulose).

PEM 900 may have a thickness d ranging from a few microns to hundreds of microns. With the configurations described herein, PEM 900 may withstand pressure differentials of up to 30 atmospheres and acidic pH gradients across the membrane. PEM 900 may also be permeable to water and protons, which may be conducted through PEM 900 as indicated by arrow 906, but PEM 900 is generally impermeable to gases including hydrogen and oxygen.

Figure 10:
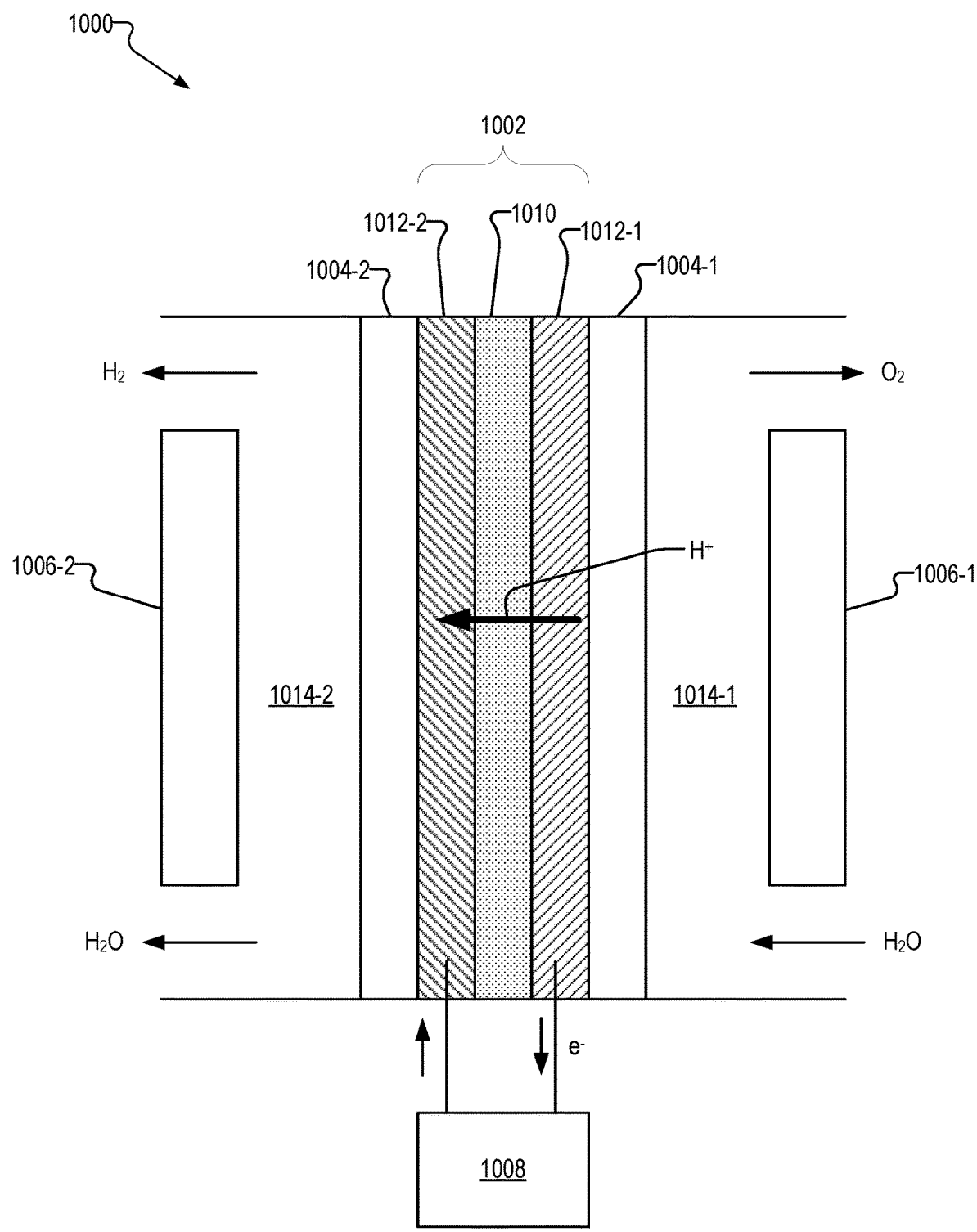
FIG. 10 shows an illustrative proton exchange membrane water electrolysis system incorporating a boron-containing porous membrane.

FIG. 10 shows an illustrative proton exchange membrane water electrolysis system 1000 (PEM water electrolysis system 1000) incorporating a boron-containing porous membrane. PEM water electrolysis system 1000 uses electricity to split water into oxygen ($O_2$) and hydrogen ($H_2$) via an electrochemical reaction. The configuration of PEM water electrolysis system 1000 is merely illustrative and not limiting, as other suitable configurations as well as other suitable water electrolysis systems may incorporate a boron-containing porous membrane.

As shown in FIG. 10, PEM water electrolysis system 1000 includes a membrane electrode assembly 1002 (MEA 1002), porous transport layers 1004-1 and 1004-2, bipolar plates 1006-1 and 1006-2, and an electrical power supply 1008. PEM water electrolysis system 1000 may also include additional or alternative components not shown in FIG. 10 as may serve a particular implementation.

MEA 1002 includes a PEM 1010 positioned between a first catalyst layer 1012-1 and a second catalyst layer 1012-2. PEM 1010 electrically isolates first catalyst layer 1012-1 from second catalyst layer 1012-2 while providing selective conductivity of cations, such as protons ($H^+$), and while being impermeable to gases such as hydrogen and oxygen. PEM 1010 may be implemented by any suitable PEM. For example, PEM 1010 may be implemented by a boron-containing porous membrane (e.g., PEM 900) comprising a porous structural framework with tetravalent boron-based acid groups bonded to pore surfaces within the porous structural framework.

First catalyst layer 1012-1 and second catalyst layer 1012-2 are electrically conductive electrodes with embedded electrochemical catalysts (not shown), such as platinum, ruthenium, and/or or cerium(IV) oxide. In some examples, first catalyst layer 1012-1 and second catalyst layer 1012-2 are formed using an ionomer to bind catalyst nanoparticles. The ionomer used to form first catalyst layer 1012-1 and second catalyst layer 1012-2 may include a tetravalent boron-containing proton-exchange solid support as described herein.

MEA 1002 is placed between porous transport layers 1004-1 and 1004-2, which are in turn placed between bipolar plates 1006-1 and 1006-2 with flow channels 1014-1 and 1014-2 located in between bipolar plates 1006 and porous transport layers 1004.

In MEA 1002, first catalyst layer 1012-1 functions as an anode and second catalyst layer 1012-2 functions as a cathode. When PEM water electrolysis system 1000 is powered by power supply 1008, an oxygen evolution reaction (OER) occurs at anode 1012-1, represented by the following electrochemical half-reaction:

$$2H_2O \rightarrow O_2 + 4H^+ + 4e^-$$

Protons are conducted from anode 1012-1 to cathode 1012-2 through PEM 1010, and electrons are conducted from anode 1012-1 to cathode 1012-2 by conductive path around PEM 1010. PEM 1010 allows for the transport of protons ($H^+$) and water from the anode 1012-1 to the cathode 1012-2 but is impermeable to oxygen and hydrogen. At cathode 1012-2, the protons combine with the electrons in a hydrogen evolution reaction (HER), represented by the following electrochemical half-reaction:

$$4H^+ + 4e^- \rightarrow 2H_2$$

The OER and HER are two complementary electrochemical reactions for splitting water by electrolysis, represented by the following overall water electrolysis reaction:

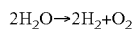

Figure 11:
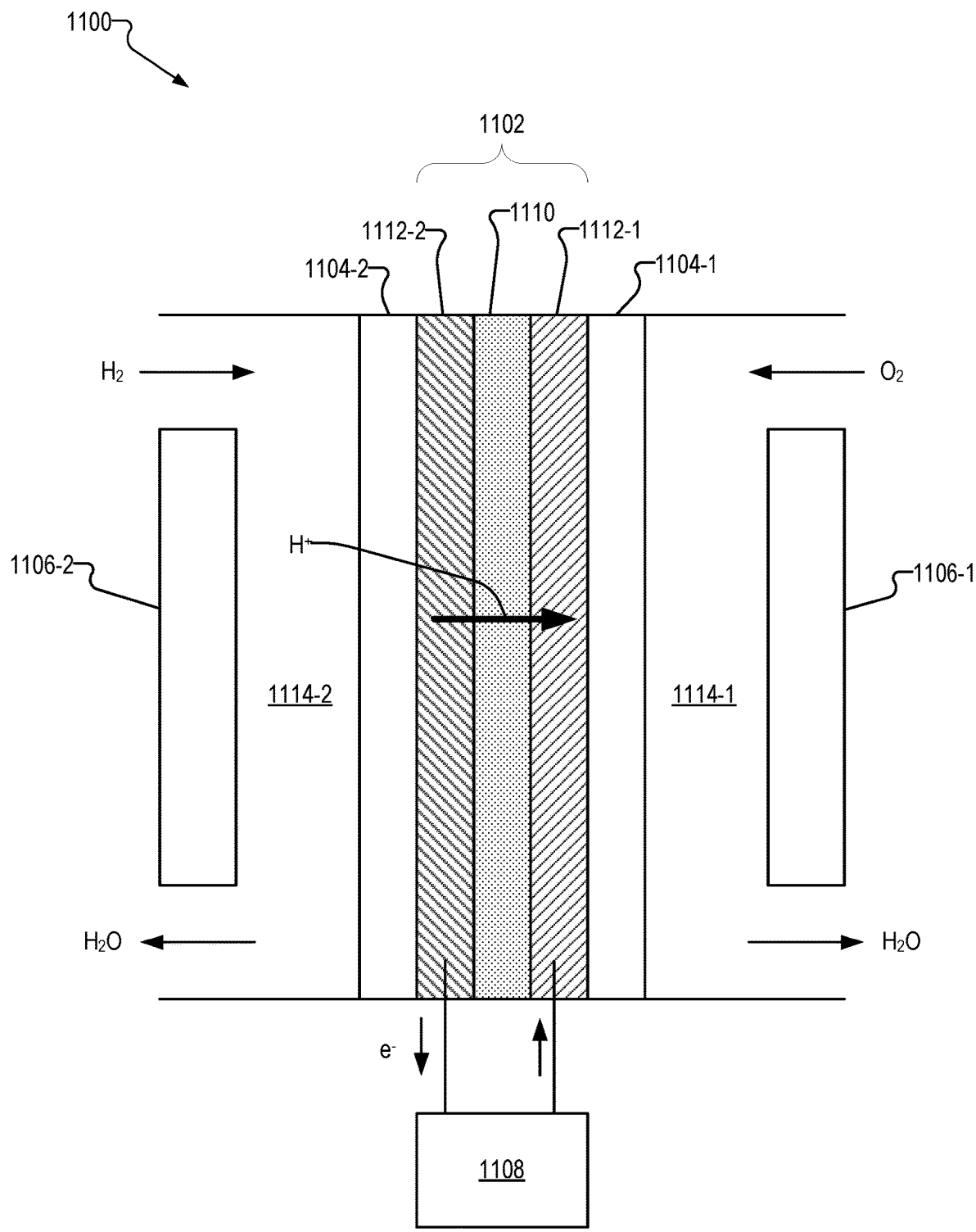
FIG. 11 shows an illustrative proton exchange membrane fuel cell incorporating a boron-containing porous membrane.

FIG. 11 shows an illustrative proton exchange membrane fuel cell 1100 (PEM fuel cell 1100) including a boron-containing porous membrane. PEM fuel cell 1100 produces electricity as a result of electrochemical reactions. In this example, the electrochemical reactions involve reacting hydrogen gas ($H_2$) and oxygen gas ($O_2$) to produce water and electricity. The configuration of PEM fuel cell 1100 is merely illustrative and not limiting, as other suitable configurations as well as other suitable proton exchange membrane fuel cells may incorporate a boron-containing porous membrane.

As shown in FIG. 11, PEM fuel cell 1100 includes a membrane electrode assembly 1102 (MEA 1102), porous transport layers 1104-1 and 1104-2, bipolar plates 1106-1 and 1106-2. An electrical load 1108 may be electrically connected to MEA 1102 and driven by PEM fuel cell 1100. PEM fuel cell 1100 may also include additional or alternative components not shown in FIG. 11 as may serve a particular implementation.

MEA 1102 includes a PEM 1110 positioned between a first catalyst layer 1112-1 and a second catalyst layer 1112-2. PEM 1110 electrically isolates first catalyst layer 1112-1 from second catalyst layer 1112-2 while providing selective conductivity of cations, such as protons ($H^+$), and while being impermeable to gases such as hydrogen and oxygen. PEM 1110 may be implemented by any suitable PEM. For example, PEM 1110 may be implemented by a boron-containing porous membrane (e.g., PEM 900) comprising a porous structural framework with boron-based acid groups bonded to pore surfaces within the porous structural framework.

First catalyst layer 1112-1 and second catalyst layer 1112-2 are electrically conductive electrodes with embedded electrochemical catalysts (not shown). In some examples, first catalyst layer 1112-1 and second catalyst layer 1112-2 are formed using an ionomer to bind catalyst nanoparticles. In some examples, the ionomer used to form first catalyst layer 1112-1 and second catalyst layer 1104-2 includes an ionomer incorporating a tetravalent boron-containing proton-exchange solid support as described herein.

MEA 1102 is placed between porous transport layers 1104-1 and 1104-2, which are in turn placed between bipolar plates 1106-1 and 1106-2 with flow channels 1114 located in between. In MEA 1102, first catalyst layer 1112-1 functions as a cathode and second catalyst layer 1112-2 functions as an anode. Cathode 1112-1 and anode 1112-2 are electrically connected to load 1108, and electricity generated by PEM fuel cell 1100 drives load 1108.

During operation of PEM fuel cell 1100, hydrogen gas ($H_2$) flows into the anode side of PEM fuel cell 1100 and oxygen gas ($O_2$) flows into the cathode side of PEM fuel cell 1100. At anode 1112-2, hydrogen molecules are catalytically split into protons ($H^+$) and electrons ($e^-$) according to the following hydrogen oxidation reaction (HOR):

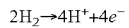

The protons are conducted from anode 1112-2 to cathode 1112-1 through PEM 1100, and the electrons are conducted from anode 1112-2 to cathode 1112-1 around PEM 1110 through a conductive path and load 1108. At cathode 1112-1, the protons and electrons combine with the oxygen gas according to the following oxygen reduction reaction (ORR):

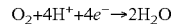

Thus, the overall electrochemical reaction for the PEM fuel cell 1100 is:

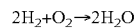

In the overall reaction, PEM fuel cell 1100 produces water at cathode 1112-1. Water may flow from cathode 1112-1 to anode 1112-2 through PEM 1110 and may be removed through outlets at the cathode side and/or anode side of PEM fuel cell 1100. The overall reaction generates electrons at the anode that drive load 1108.

The tetravalent boron-containing proton-exchange solid supports described herein (incorporated as a porous structural framework (e.g., PEM 900) or as solid support particles) may also be used as a pathogen-neutralizing porous membrane. For example, porous structural framework 902 may have pores that are small enough to prevent the passage of pathogens such as bacteria, fungal spores, and viruses. The boron-based acid groups 904 may also have antipathogenic activity against bacteria, fungi, and viruses, including SARS-CoV-2. For example, the basic protein sites of pathogens, including SARS-CoV-2, may ionically bond with the acidic boron sites of the proton exchange membranes, thereby preventing passage of the pathogens through the proton exchange membranes. As a result, the proton exchange membranes may be implemented in face masks, surgical masks, and air filters and air purification systems for enclosed spaces (e.g., homes, offices, factories, vehicles, airplanes, etc.).

In the preceding description, various illustrative embodiments have been described with reference to the accompanying drawings. It will, however, be evident that various modifications and changes may be made thereto, and additional embodiments may be implemented, without departing from the scope of the claims that follow. For example, certain features of one embodiment described herein may be combined with or substituted for features of another embodiment described herein. The description and drawings are accordingly to be regarded in an illustrative rather than a restrictive sense.

What is claimed is:

1. A boron-containing proton-exchange solid support comprising:
   a proton-exchange solid support comprising an oxygen atom; and
   a pendant tetravalent boron-based acid group comprising a boron atom covalently bonded to three fluorine atoms and to the oxygen atom, the boron atom having a negative formal charge; and
   a cation ionically linked to the boron atom.

2. The boron-containing proton-exchange solid support of claim 1, wherein the proton-exchange solid support further comprises a sulfur atom, a carbon atom, or a phosphorous atom covalently bonded to the oxygen atom.

3. The boron-containing proton-exchange solid support of claim 2, wherein the sulfur atom, the carbon atom, or the phosphorous atom is covalently bonded to an additional oxygen atom by a double bond.

4. The boron-containing proton-exchange solid support of claim 2, further comprising:
   an additional pendant tetravalent boron-based acid group comprising an additional boron atom;

wherein:
the sulfur atom, the carbon atom, or the phosphorous atom is further covalently bonded to an additional oxygen atom; and
the additional boron atom is covalently bonded to the additional oxygen atom.

5. The boron-containing proton-exchange solid support of claim 2, wherein the proton-exchange solid support further comprises:
a linker chain bonded to the sulfur atom, the carbon atom, or the phosphorous atom,
wherein the linker chain comprises a $C_1$ to $C_{30}$ alkyl chain and optionally has one or more pendant moieties, which may be the same or different for each atom in the linker chain and which may comprise hydrogen, a hydroxyl group, a fluoro group, a chloro group, a dialkylamino group, a cyano group, a carboxylic acid group, a carboxylic amide group, an ester group, an alkyl group, an alkoxy group, or an aryl group.

6. The boron-containing proton-exchange solid support of claim 1, wherein the proton-exchange solid support comprises an inorganic material.

7. The boron-containing proton-exchange solid support of claim 1, wherein the proton-exchange solid support comprises an organic material.

8. The boron-containing proton-exchange solid support of claim 1, wherein the proton-exchange solid support comprises a microparticle or a nanoparticle.

9. The boron-containing proton-exchange solid support of claim 1, wherein:
the proton-exchange solid support comprises a porous polymer network; and
the pendant tetravalent boron-based acid group is located at a pore surface of the porous polymer network.

10. A boron-containing proton-exchange solid support having general formula (Ia), (Ib), (Ic), or (Id):

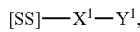 (Ia)

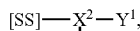 (Ib)

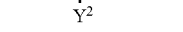 (Ic)

 (Id)

wherein:
[SS] represents a solid support;
$X^1$ represents a substituent group having formula (IIa), (IIb), (IIc), or (IId):

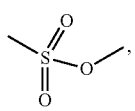 (IIa)

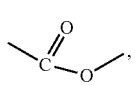 (IIb)

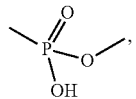 (IIc)

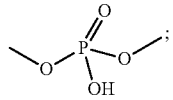 (IId)

$X^2$ represents a group having formula (IIIa) or (IIIb):

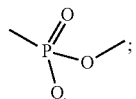 (IIIa)

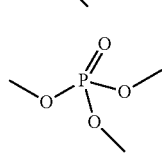 (IIIb)

$Y^1$ and $Y^2$ are the same or different and each represent a tetravalent boron-based acid group having formula (IV):

 (IV)

where the boron (B) atom of formula (IV) is covalently bonded to the oxygen (O) atom of $X^1$ or $X^2$, has a negative formal charge, and is ionically linked to a cation; and
R represents a $C_1$ to $C_{30}$ alkyl linker chain and optionally has one or more pendant moieties, which may be the same or different for each atom in the linker chain and which may comprise hydrogen, a hydroxyl group, a fluoro group, a chloro group, a dialkylamino group, a cyano group, a carboxylic acid group, a carboxylic amide group, a carboxylic ester group, an alkyl group, an alkoxy group, and an aryl group.

11. The boron-containing proton-exchange solid support of claim 10, wherein:
[SS]-$X^1$, [SS]-$X^2$, [SS]-R-$X^1$, and [SS]-R-$X^2$ each comprises a porous polymer network; and
$Y^1$ and $Y^2$ are located at pore surfaces of the porous polymer network.

12. A method of making a boron-containing proton-exchange solid support, the method comprising:
modifying a proton-exchange solid support comprising a pendant hydroxyl group with a pendant tetravalent boron-based acid group comprising a boron atom covalently bonded to three fluorine atoms and to an oxygen atom of the pendant hydroxyl group, the boron atom having a negative formal charge; and
ionically linking a cation to the boron atom.

13. The method of claim 12, wherein the modifying comprises combining boron trifluoride with the pendant hydroxyl group.

14. The method of claim 12, wherein the proton-exchange solid support comprises one or more of an inorganic material and an organic material.

15. The method of claim 12, wherein the proton-exchange solid support comprises an ionomer.

16. The method of claim 12, wherein the proton-exchange solid support comprises a microparticle or a nanoparticle.

17. The method of claim 12, wherein:
the proton-exchange solid support comprises a porous polymer network; and
the pendant tetravalent boron-based acid group is located at a pore surface of the porous polymer network.

18. The method of claim 12, wherein the proton-exchange solid support comprises a pendant acid group comprising the pendant hydroxyl group, the pendant acid group comprising a sulfonic acid group, a carboxylic acid group, a phosphonic acid group, a phenol group, or a phosphate group.

19. The method of claim 12, further comprising:
modifying the proton-exchange solid support with an additional pendant tetravalent boron-based acid group.

20. The method of claim 19, wherein:
the proton-exchange solid support comprises a phosphonic acid group comprising the pendant hydroxyl group and an additional pendant hydroxyl group; and
the modifying the proton-exchange solid support with the pendant tetravalent boron-based acid group comprises combining boron trifluoride with the pendant hydroxyl group; and
the modifying the proton-exchange solid support with the additional pendant tetravalent boron-based acid group comprises combining boron trifluoride with the additional pendant hydroxyl group.

21. A membrane electrode assembly, comprising:
a cathode;
an anode; and
a proton exchange membrane positioned between the cathode and the anode, the proton exchange membrane comprising a proton-exchange solid support comprising:
an oxygen atom;
a pendant tetravalent boron-based acid group comprising a boron atom covalently bonded to three fluorine atoms and to the oxygen atom, the boron atom having a negative formal charge; and
a cation ionically linked to the boron atom.

22. The boron-containing proton-exchange solid support of claim 1, wherein the proton-exchange solid support comprises an ionomer.

23. The method of claim 12, wherein the proton-exchange solid support comprises a sulfonic acid-functionalized polymer.

24. The method of claim 12, wherein the proton-exchange solid support comprises a carboxylic acid-functionalized polymer.

25. The method of claim 12, wherein the proton-exchange solid support comprises a phosphonic acid-functionalized polymer.

26. The method of claim 12, wherein the proton-exchange solid support comprises a phosphate-functionalized polymer.

* * * * *